(No Model.)
A. HANSEN.
MATCH SAFE.
No. 519,949. Patented May 15, 1894.
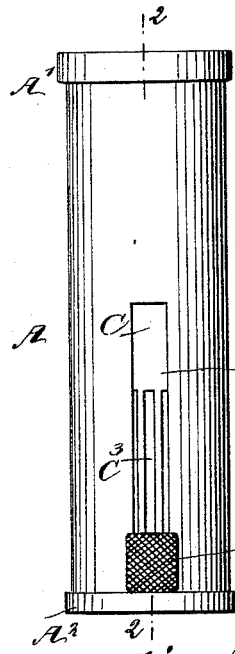
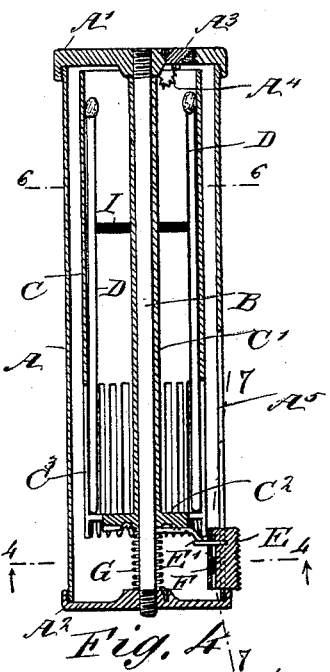
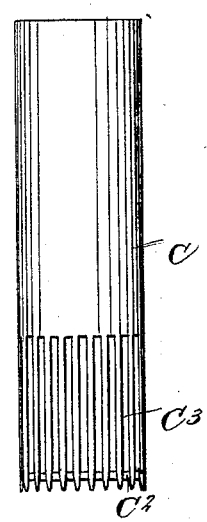
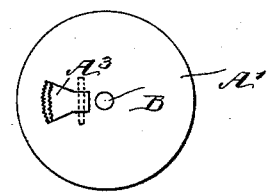
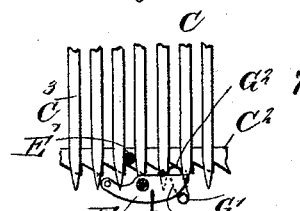
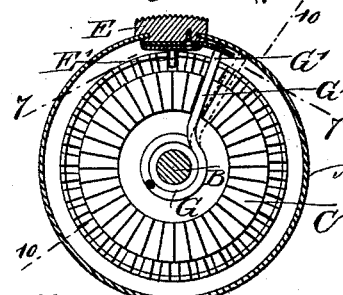
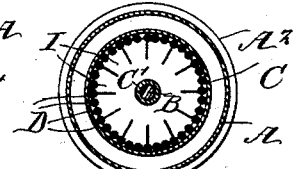
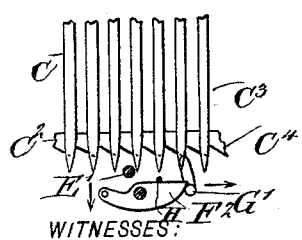
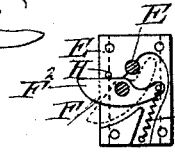
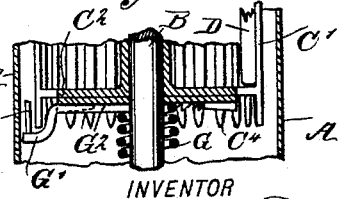
WITNESSES:
C. Neveux
C. Sedgwick
INVENTOR
A. Hansen
BY Munn & Co
ATTORNEYS.

UNITED STATES PATENT OFFICE.

ALFRED HANSEN, OF SIDNEY, NEBRASKA.

MATCH-SAFE.

SPECIFICATION forming part of Letters Patent No. 519,949, dated May 15, 1894.

Application filed August 9, 1893. Serial No. 482,718. (No model.)

*To all whom it may concern:*

Be it known that I, ALFRED HANSEN, of Sidney, in the county of Cheyenne and State of Nebraska, have invented a new and Improved Match-Safe, of which the following is a full, clear, and exact description.

The object of the invention is to provide a new and improved match-safe, which is simple and durable in construction and arranged to automatically deliver and light a single match at a time.

The invention consists of a revoluble cylinder arranged within a casing and supporting the matches, and a slide having a pin adapted to project into the cylinder through slots in the same to engage a match and push it upward through a trap door in the casing, the said slide also serving to revolve the cylinder on its downward stroke.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a transverse section of the same on the line 2—2 of Fig. 1. Fig. 3 is a side elevation of the match-containing cylinder. Fig. 4 is an enlarged sectional plan view of the improvement on the line 4—4 of Fig. 2. Fig. 5 is a plan view of the casing. Fig. 6 is a sectional plan view of the improvement on the line 6—6 of Fig. 2. Fig. 7 is an enlarged side elevation of part of the mechanism for turning the cylinder, the section being taken on the line 7—7 of Fig. 2. Fig. 8 is a similar view of the same with the parts in a different position. Fig. 9 is a like view of the same with parts in still another position. Fig. 10 is a transverse section of the same on the line 10—10 in Fig. 4; and Fig. 11 is a rear face view of the slide with parts in section.

The improved match-safe is provided with a casing A preferably made in cylindrical form and closed at its ends by the caps A' and $A^2$ in which is secured a rod B, extending centrally through the cylinder A, as plainly shown in Figs. 2 and 4. On this rod B is mounted to turn the hub C' of a cylinder C extending within the casing A and somewhat less in diameter than the latter, as will be readily understood by reference to the drawings. The upper end of the cylinder C is open and the lower end connects the hub C' with the rim of the cylinder by means of a web $C^2$ on which rest the lower ends of the matches D leading against the inner surface of the cylinder C and extending upwardly with their heads, as indicated in Fig. 2. The matches D are adapted to be moved upward in the cylinder C by a slide E, as hereinafter more fully described, so that as the match moves upward it engages an upwardly swinging trap door $A^3$ hinged in the cap A' and held normally closed by a spring $A^4$, see Fig. 2. The under surface of the trap door $A^3$ and one side of its seat are preferably serrated so that as the head strikes the serrated portions in its upward movement to open the door $A^3$ the head of the match is ignited at the time the match passes through the door to the outside of the casing. The lower portion of the cylinder C is formed with vertically-arranged slots $C^3$ into which is adapted to pass a pin E' projecting from the inside of the slide E fitted to slide vertically in guideways $A^5$ formed by cutting a slot in the side of the casing A. When the slide E is in its lowermost position, the pin E' is below the lower edge of the cylinder C and when the slide is pushed upward, the pin E' passes into the corresponding slot $C^3$ to engage a match supported on the web $C^2$, so that the match is moved upward on the further upward movement of the slide, to pass through the door $A^3$ and be ignited, as above described.

In order to turn the cylinder C such a distance as to bring the next following match in alignment with the pin E', after the slide has been moved downward into its lowermost position, the following device is provided: On the rear or inner face of the slide E is pivoted a lever F pressed on at its rear end by a spring F' and having the movement of its forward end $F^2$ limited by a stop pin H attached to the slide E, see Figs. 7, 8, 9 and 11. The forward end $F^2$ of this lever F has its under side rounded to engage on the downward movement of the slide, an arm G', projecting from the horizontally-extending upper end $G^2$ of a coil spring G, coiled around the lower part of the rod B and secured at its lower end in the cap A². The horizontal upper end G² of the said coil spring is adapted to engage a ratchet wheel C⁴ formed on the under side of the web C², as plainly illustrated in Figs. 4 and 10. Now, when the slide E moves downward and its end F² engages the arm G', then the latter is pushed to one side as the lever F is held in place by its stop pin H. This sidewise pressing of the arm G' causes a slight coiling up or compressing of the spring G, it being understood that the horizontal end G³ of the said spring glides during this operation, over the teeth of the ratchet wheel C⁴, as the cylinder C is prevented from turning, owing to the pin E' still engaging one of the slots C³ of the cylinder C. When, however, on the further downward movement of the slide E, the pin E' finally leaves the lower end of the corresponding slot C³ then the forward end F² of the lever F passes the arm G' so that the spring G uncoils and as the end G² engages the ratchet teeth of the ratchet wheel C⁴, the cylinder C is caused to turn the distance between two successive slots, so as to bring the next slot in alignment with the pin E'. On the next upward sliding movement of the slide E its pin E' engages the next following slot and match to push the latter upward through the trap door A³, as previously described. In moving the slide E upward, the end F² of the lever F engages the arm G' so as to cause the lever to turn until this end F² has passed the arm G', after which the spring F' returns the lever to its normal position shown in Fig. 8, that is, with the forward end F² resting against the stop pin H. In order to hold the matches against the inner surface of the cylinder C, I fasten to the hub C', near the upper end of the same, a rubber disk I in contact at its periphery with the several matches, as will be readily understood by reference to Figs. 2 and 6.

In order to fill the cylinder, the cap A' is removed from the casing A and then the matches are inserted against the inner surface of the cylinder C by pushing the matches past the periphery of the rubber disk I.

It will be seen that a match-safe of this construction will permit the operator to conveniently push a single match at a time out of the cylinder, at the same time lighting the match while it passes to the outside.

Having thus fully described my invention, I claim as new and desire to secure by Letters Patent—

1. A match safe, comprising a casing, a hollow cylinder for containing and supporting the matches, the said cylinder being open at its upper end and mounted to revolve in the said casing and having a series of longitudinal slots formed in its lower portion, and a slide fitted to move on the casing and having a lateral pin adapted to project through said slot to the inside of the cylinder to engage the matches, substantially as shown and described.

2. In a match safe, the combination with a fixed shaft, a revoluble cylinder having a ratchet on its lower end and longitudinal slots as specified, a spring coiled about the shaft and its free end projected laterally, of the slide having a lateral pin and a device attached to the slide and adapted to engage with the free end of the spring, and move it over the teeth of the ratchet wheel and to release said spring so that it can engage with the ratchet teeth and rotate the cylinder, substantially as shown and described.

3. A match safe, comprising a casing, a hollow cylinder for containing the matches, the said cylinder being mounted to revolve within the said casing and provided with a series of slots in its lower portion, an elastic disk arranged within the cylinder and adapted to bear against the matches and hold them in contact with the inner surface of the cylinder, and a match ejecting device adapted to work in the slots of the cylinder, as and for the purpose specified.

4. The match holder proper composed of the hollow cylinder open at one end, the circular rubber plate or disk arranged in the said cylinder transversely to its axis, and adapted to bear against the matches and hold them in an upright position against the inner surface of the cylinder, and means for supporting the disk at its center, substantially as shown and described.

5. In a match-safe, the combination with a revoluble cylinder provided on its web with a ratchet wheel, a coil spring having one end fixed and its other end adapted to engage the said ratchet wheel, an arm projecting from the said end, a spring-pressed lever adapted to engage the said coil spring arm, so as to push the latter to one side on its downward movement to wind up the said coil spring, and to disengage the said arm to permit the spring to uncoil, substantially as shown and described.

6. In a match-safe, the combination with a revoluble cylinder provided on its web with a ratchet wheel, a coil spring having one end fixed and its other end adapted to engage the said ratchet wheel, an arm projecting from the said end, a spring-pressed lever adapted to engage the said coil spring arm, so as to push the latter to one side on its downward movement to wind up the said coil spring, and to disengage the said arm to permit the spring to uncoil, and a slide carrying the said lever and provided with a pin adapted to engage a slot in the said cylinder, to prevent the latter from turning during part of the downward movement of the said slide, substantially as shown and described.

ALFRED HANSEN.

Witnesses:
JOSEPH OBERFELDER,
NORMAN A. CRAMER.